W. C. STEVENS.
UNIVERSAL CHUCK.
APPLICATION FILED JUNE 18, 1915.

1,181,355.

Patented May 2, 1916.
2 SHEETS—SHEET 1.

Witness:
Edwin J. Wright
Louis F. Geist

Inventor
William C. Stevens
By C. C. Linthicum
Attorney

UNITED STATES PATENT OFFICE.

WILLIAM C. STEVENS, OF AKRON, OHIO, ASSIGNOR TO THE FIRESTONE TIRE & RUBBER COMPANY, OF AKRON, OHIO, A CORPORATION OF OHIO.

UNIVERSAL CHUCK.

1,181,355.   Specification of Letters Patent.   Patented May 2, 1916.

Application filed June 18, 1915. Serial No. 34,804.

*To all whom it may concern:*

Be it known that I, WILLIAM C. STEVENS, a citizen of the United States, residing at Akron, in the county of Summit and State of Ohio, have invented certain new and useful Improvements in Universal Chucks, of which the following is a specification.

This invention relates to universal chucks, particularly those adapted for holding annular objects, although the invention is not limited to holding this particular shape of object, but the principles involved therein may be applied to chucks for holding articles of all shapes and sizes.

Specifically, this invention relates to chucks for holding wheel rims while in a lathe during grinding, scoring, or similar operations.

In mounting rims upon chucks, it is essential that the rim be accurately placed with the holding points of the chuck at the transverse center of the article, in order to be firmly held. Prior to this invention, the exact placing of the rim so that the chuck would firmly hold it in the center, was a tedious and usually, an inaccurate operation.

It has been the purpose of this invention to construct a chuck such that rims could be quickly and accurately placed thereon. In order to do this, there are provided a series of adjustable stops, which are so constructed that with their aid, a rim of any diameter and of any width within the range of the chuck, can be quickly and accurately placed thereon. In use, it is customary to work upon a number of rims of the same size at a time, and the adjustments having been made for the first rim, the rest of the lot may be accurately placed on the chuck without loss of time in positioning them.

These and other objects will be apparent to any one skilled in the art, from the specification and drawings.

Figure 1:
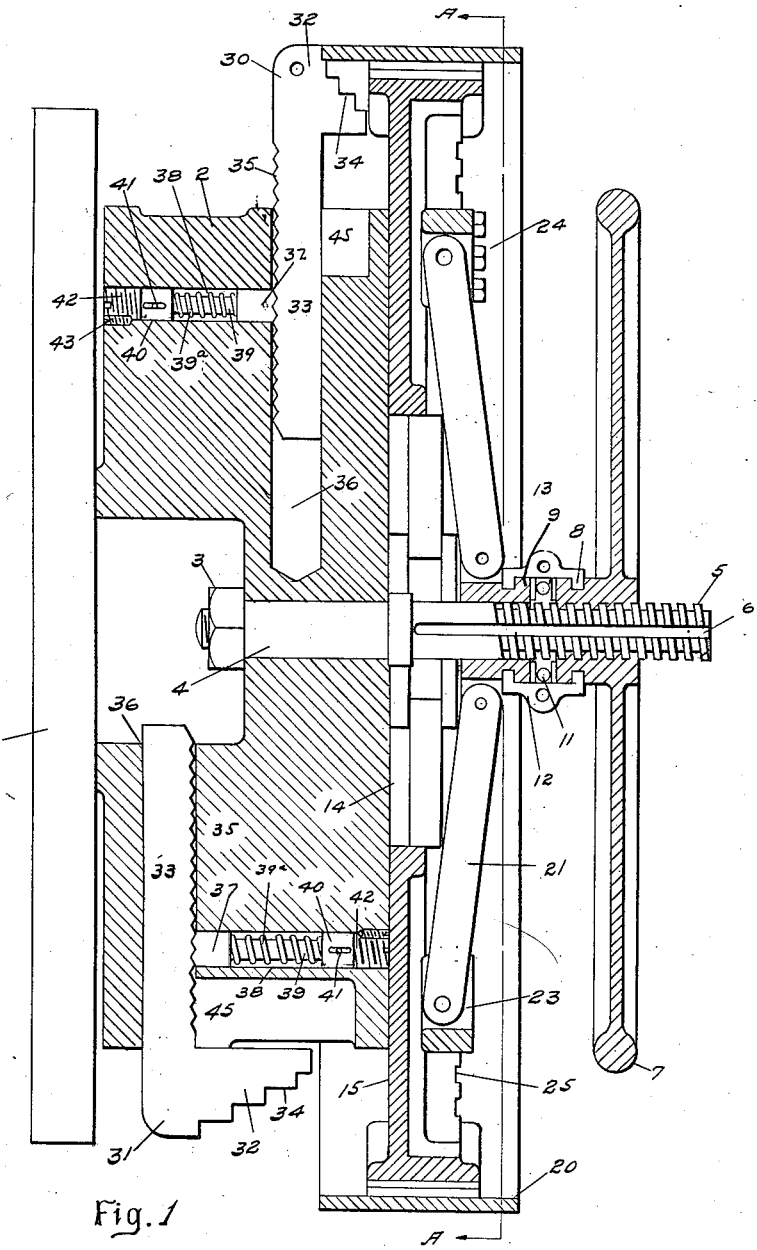
Figure 2:
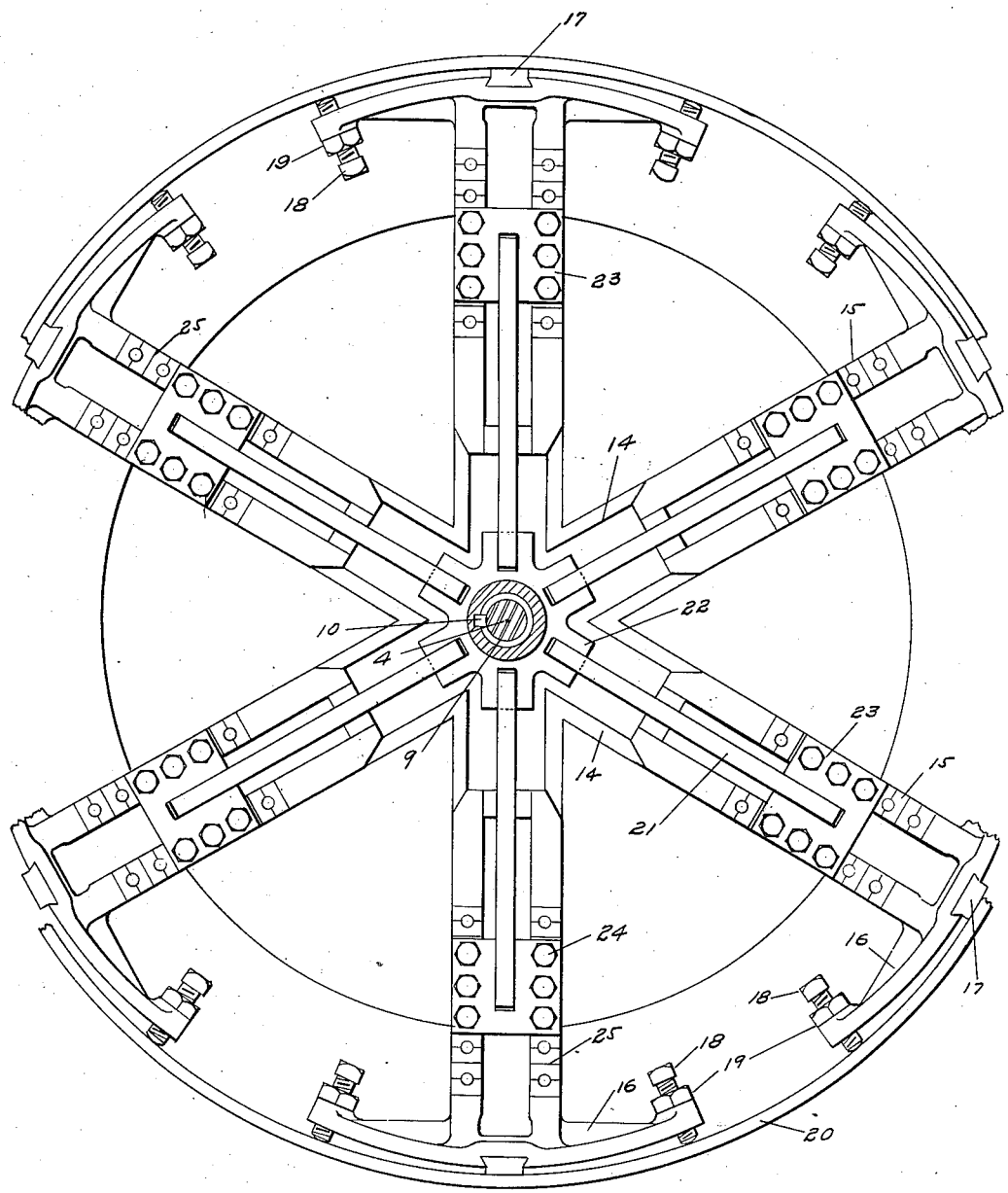

In the drawings, in which like reference numerals refer to like parts: Figure 1 is a section taken on the axis of the chuck. Fig. 2 is a section transverse the axis of the chuck on the line A—A of Fig. 1.

Referring to the drawings, 1 represents the head of any ordinary lathe, to which is removably secured in any suitable manner, the body 2 of the chuck. In the center of the chuck body is secured by nut 3, a pin or bolt 4, which extends forwardly of the chuck body, and is provided with a screw threaded outer end 5. Down one side of the protruding portion of the center pin, is formed a keyway 6. In screw threaded connection to the outer end of the center pin, is a hand-wheel 7, the hub of which projects toward the chuck body, and is provided with a groove 8. Between the hand-wheel and the body of the chuck, there is mounted on the center pin, a collar or sleeve 9, which is free to slide on the pin, but prevented from turning thereon, by a key 10, received in the keyway 6. Between the hub of the hand-wheel and the sliding collar is interposed a ball-bearing 11, and inclosing said ball-bearing, and holding the hand-wheel and the collar properly spaced, is a thrust coupling 12 which has down turned edges received in the groove 8 on the sliding collar. It will be readily seen that upon rotation of the hand-wheel, the collar 9 will be moved on the center pin without turning.

In the face of the chuck body is located a series of radial grooves 14, shown as six in number, in which are slidably mounted, the shanks of T-shaped arms 15. The head of each of these arms is segmental in form, and in the center thereof is mounted a removable bearing piece or shim 17, and in the ends set screws 18 held by jam nuts 19. The shims and the ends of the set screws are the bearing points for the inside of the rims, and by making the set screws adjustable as shown, a firm hold may be obtained on the rim at a plurality of points. A rim is shown mounted on the chuck at 20.

The arms 15 are operated from the sliding collar 9 by links 21 pivoted at their inner ends to lugs 22 on the collar, and at their outer ends to plates 23, which are securely fastened to the sliding arms by bolts 24, the upper surfaces of the arms and the lower surfaces of the plates being provided with inter-engaging teeth 25, to prevent slipping.

The foregoing constitutes the means for holding the rim. As stated heretofore, this chuck embodies features which enable rims of any diameter and any width, to be placed quickly and accurately with the arms at the midway point of the rim.

In the body of the chuck at the rear of the sliding arms are provided two sets of adjustable rim positioning arms, or stops. There are preferably three of these stops in a set, the two sets are in different planes, and the stops in the sets are accurately spaced about the chuck. It is also preferable to have the tops of the two sets out of register, and for this purpose, a single stop may be placed directly behind each one of the six sliding arms.

In Fig. 1, one stop of each set is shown, the narrower rim stop or positioning arm is designated 30, and the broad rim stop is designated 31. Each stop is provided with an outwardly projecting head 32, and a long shank 33, the head being provided with a series of graduations 34, which are preferably arranged in step-like formation faced toward the front of the chuck. The shanks are provided with a series of teeth or corrugations 35, the corrugations in the narrow rim stops facing toward the rear of the chuck, and the corrugations on the broad rim stops facing toward the front of the chuck. The shanks of the rim stops are received in radial bores 36 in the body of the chuck.

Coöperating with the roughened or sawtooth edges of each sliding stop, is the correspondingly shaped end of a pin or pawl 37, slidably mounted in a bore 38, communicating with and at right angles to the aperture 36. The hoe 38 leading to the narrow rim stop opens on the back of the chuck body, while the hole leading to the broad rim stop opens on the face of the chuck body under one of the sliding arms. Each pin 37 is provided with a reduced stem 39, around which is placed a spring 39ª. At the outer end of the bore is placed a tap screw 42, which when screwed home, holds the pawl in contact with the saw edge of the band stop, and effectually prevents movement thereof, and is provided with a guiding collar 40, provided with a slot 41 for the reception of guiding means projecting from the stem of the pin. Small screws 43 may be provided for holding the larger screws 42. Should it be desired to adjust either set of band or rim stops, the screws 42 are moved outwardly, and then the stops can be shifted in or out to any desired position, the springs allowing the pins to vibrate and the guiding collars preventing them from turning. Recesses 45 are provided in the sides of the chuck body to receive the heads of the adjustable stops. The operation should be readily understood from the foregoing, and a brief résumé thereof will be sufficient to make it clear.

It being desired to operate upon a set of rims of a given width and diameter, a step 34 is chosen, which when the rim or band is placed against it, will bring the middle point of its surface directly over the center point of the chuck arms. After loosening the pawls, the three stops of the set are moved to such position as to bring the step or graduation 34 to the inside circumference of the object. The stops are now fixed by screwing in the tap screws, and the chuck is set. A rim is placed on the positioning arms, and will naturally seat itself on the predetermined step 34. The hand-wheel is then turned and the arms are moved inwardly until they firmly grasp the rim. After the work on the first rim is finished, it is taken off, and the next one placed over the arms, it being accurately located in the same position. The arms are then forced out, and it is securely held.

It will be seen that the chuck is adapted to handle in the manner indicated, rims of a diameter equal to the largest diameter which the chuck arms will accommodate, and of a width equal to double the distance from the outside notch in the broad band stop to the center of the arms. It is not intended, however, to limit this invention to the particular form of chuck here shown, or to the particular form of stops, nor is it intended to limit it to two sets of stops only, as three or more could be used.

It is obvious that other changes and modifications of the form shown might be made, without departing from the spirit of the invention, as set forth in the appended claims.

Claims:

1. The combination of a chuck body, expansible arms on said chuck body and means independent of said arms for positioning an article in two directions thereon.

2. The combination of a chuck body, expansible arms on said chuck body, stops independent of said arms for locating an article in predetermined relation in two directions to the clamping position of said arms.

3. The combination of a chuck body, expansible arms for clamping the inside of annular bodies of differing widths, a series of stops independent of said arms adapted to position any of said annular bodies with its transverse center over said expansible arms.

4. The combination of a chuck body, expansible arms for clamping the inside of an annular body, a series of stops independent of said arms adapted to position and support said annular body with its axis coincident with the axis of the chuck body and its transverse center over said expansible arms.

5. The combination of a chuck body, expansible arms for clamping the inside of a hollow body, a stop adapted to position said hollow body axially and laterally relative to said expansible arms, and means to adjust said stop laterally of said chuck body.

6. The combination of a chuck body, expansible article holding arms on said chuck body, article positioning arms in said chuck body, and a series of graduated stops on said arms.

7. The combination of a chuck body, expansible article holding arms on said chuck body, article positioning arms in said chuck body, means for holding said last mentioned arms in any radial adjustment, and a series of graduated stops on said arms.

8. The combination of a chuck body, expansible article holding arms on said chuck body, two sets of article positioning arms in different planes in said chuck body, a series of graduated stops on said positioning arms, and means for holding said positioning arms in any radial adjustment.

WILLIAM C. STEVENS.

Witness:
J. J. SHEA.